United States Patent [19]
Yuge

[11] Patent Number: 5,307,501
[45] Date of Patent: Apr. 26, 1994

[54] INSURING DATA SECURITY AND REQUIRING ONLY THE MINIMUM NECESSARY INPUT OPERATIONS

[75] Inventor: Kazuo Yuge, Yachiyo, Japan

[73] Assignees: Hitachi Keiyo Engineering Co., Ltd., Narashino; Hitachi, Ltd., Tokyo, both of Japan

[21] Appl. No.: 921,387

[22] Filed: Jul. 30, 1992

Related U.S. Application Data

[63] Continuation of Ser. No. 423,630, Oct. 13, 1989, abandoned, which is a continuation of Ser. No. 37,845, Apr. 13, 1987, abandoned.

[30] Foreign Application Priority Data

Apr. 11, 1986 [JP] Japan .................................. 61-82115

[51] Int. Cl.⁵ .............................................. G06F 13/00
[52] U.S. Cl. ...................................... 395/800; 395/113; 395/155; 364/DIG. 2; 364/933.9; 364/948.2; 364/949.96
[58] Field of Search ... 364/200 MS File, 900 MS File; 340/706, 708, 711, 789, 790, 794; 395/113, 155, 800; 380/4

[56] References Cited

U.S. PATENT DOCUMENTS 4,403,303 9/1983 Howes et al. ..................... 395/500
4,604,686 8/1986 Reiter et al. ...................... 395/500

Primary Examiner—Paul V. Kulik
Attorney, Agent, or Firm—Antonelli, Terry, Stout & Kraus

[57] ABSTRACT

In a data processor including an input device for inputting commands and data, a central processing unit for executing processing in accordance with the input command or data from the input device and a display device for displaying the input command or data from the input device or the message generated by the central processing unit, the present invention discloses a data processor comprising an automatic input data memory for storing a trigger data to be displayed on the display device and automatic input data corresponding to the trigger data, a judgement device for judging whether or not the display of the display device is in agreement with the trigger data stored in the automatic input data memory, and an automatic input device for outputting the automatic input data corresponding to the trigger data from the automatic input data memory to the central processing unit in accordance with the result of the judgement operation performed by the judgement device.

9 Claims, 8 Drawing Sheets

FIG. 3

| TRIGGER DATA | | INPUT DATA |
|---|---|---|
| DISPLAY POSITION | DISPLAY CHARACTER | |
| 1 ROW . 5 COLUMN | ENTER LOG | LOGON |

FIG. 5

| STEP | TRIGGER DATA | | INPUT DATA | CHECKING TIME | STEP IN CASE OF UNSUCCESS |
|---|---|---|---|---|---|
| | DISPLAY POSITION | DISPLAY CHARACTER | | | |
| 1 | —— ※1 | —— ※1 | LOGON | —— ※1 | —— ※1 |
| 2 | 2 ROW, 3 COLUMN | MODE= | TSS | 10 | 1 |
| 3 | 3 3 | TERMID= | H 200 | 10 | 1 |
| 4 | 4 3 | YOUR ID= | 4671 | 5 | 3 |
| 5 | 5 3 | SEARCHER= | K.Y | 5 | 3 |
| 6 | 10 5 | GO | RUN | 20 | 5 |

| ROW (LOWER) | ROW (HIGHER) | COLUMN (LOWER) | COLUMN (HIGHER) | DISPLAYED COLOUR | DISPLAYED CHARACTER |
|---|---|---|---|---|---|
| 1 | 20 | 1 | 80 | WHITE | ENTER |
| 1 | 1 | 1 | 1 | RED | LOG |

FIG. 9

| STEP | DISPLAY POSITION | | DISPLAY CHARACTER | INPUT DATA |
|---|---|---|---|---|
| | ROW | COLUMN | | |
| 1 | 1 | 1 | ENTER LOGON | LOGON |
| 2 | 2 | 3 | MODE = | TSS |
| 3 | 3 | 3 | TERMID = | H 200 |
| 4 | 4 | 20 | 4671 | ——— |
| 5 | 5 | 20 | K.Y | ——— |
| 6 | 10 | 5 | GO | RUN |
| 7 | 11 | 5 | START | SUB |

FIG. 10

| STEP | DISPLAY CHARACTER | INPUT DATA |
|---|---|---|
| 1 | ENTER LOGON | LOGON |
| 2 | MODE = | TSS |
| 3 | TERMID = | H 200 |
| 4 | A 123 | CAN 4671 |
| 5 | X Y Z | CAN K.T |
| 6 | GO | RUN |
| 7 | START | SUB |

FIG. 12

| STEP | DISPLAY CHARACTER | INPUT DATA |
|---|---|---|
| 1 | ——— | FCNV |
| 2 | MODE | 8 |
| 3 | S-FILE | B: SDATA 001 |
| 4 | CODE FORM | YES 512 |
| 5 | D-FILE | C:DDATA 001 |

FIG. 13

| STEP | DISPLAY CHARACTER | INPUT DATA |
|---|---|---|
| 1 | ——— | FCNV |
| 2 | K.Y | CAN  (CANCEL) |
| 3 | MODE | 8 |
| 4 | S-FILE | B:SDATA 001 |
| 5 | CODE | YES 512 |
| 6 | D-FILE | C:D DATA 001 |

INSURING DATA SECURITY AND REQUIRING ONLY THE MINIMUM NECESSARY INPUT OPERATIONS

This application is a continuation of application Ser. No. 423,630, filed on Oct. 13, 1989 which is a continuation application of application Ser. No. 037,845 filed Apr. 13, 1987.

BACKGROUND OF THE INVENTION

This invention relates to an input reduction system in a computer system utilizing a personal computer or the like, and more particularly to a system which is suitable for carrying out an input work where data security is necessary.

In a computer system using a personal computer or a host computer, a data processor equipped with a so-called "automatic data input system" has been proposed conventionally in order to reduce an input operation of commands or data. In the data processor equipped with such an automatic data input system, commands or data necessary for data processing are inputted exclusively or reply data that have in advance been prepared so as to correspond to messages from the system are outputted.

The data processor equipped with this conventional automatic data input system does not sufficiently take into consideration the necessity of data security such as pass-words and the possibility of data-leakage to a third party. Moreover, since the check of the pass-word is made only by a counterpart system, the data processor has the problem that the pass-word cannot be assigned locally to each operator and cannot be freely registered or revised.

SUMMARY OF THE INVENTION

It is therefore an object of the present invention to provide a data processor equipped with an automatic data input system which can insure data security which can be easily and flexibly revised, and requires only the minimum necessary input operations.

It is another object of the present invention to provide a data processor which executes the input operation of regular formats without operation of an operator.

The objects described above can be accomplished by using the input data inputted by an operator as trigger data along with a message from a counter-system (or from an application program), storing in advance the trigger data (the message from the counter-system and the data inputted by the operator) in a memory area, checking whether or not the trigger data and the display content satisfy a certain relation and processing data, that is inputted anew, as if it were inputted from an input device in accordance with the result of the checking operation.

In other words, in accordance with the present invention, the data, that is inputted anew, can be inputted as data inputted by the operator and serve as trigger data along with a message from the counter-system.

Therefore, if the data that is not generated by the counter-system is registered as the trigger data, the input operation is not performed unless the registered data is inputted from the operator.

In this manner, data security can be insured by registering a local pass-word for each operator to the trigger data.

Since this local pass-word is not dependent on a host computer, it can be revised and registered very easily.

Furthermore, the input operation of data of a regular format can be carried out without through the operator by monitoring the display data displayed on a display device and preparing a large number of combinations of the data to be inputted when the display data is displayed.

BRIEF DESCRIPTION OF THE DRAWINGS

FIG. 3 is an explanatory view useful for explaining the construction of registered data of the embodiment shown in FIG. 1;

FIG. 5 is an explanatory view useful for explaining the construction of registered data in another embodiment of the present invention;

FIGS. 9 and 10 are explanatory views useful for explaining the construction of other registered data;

FIGS. 12 and 13 are explanatory views useful for explaining the construction of other registered data, respectively.

DESCRIPTION OF THE PREFERRED EMBODIMENTS

Hereinafter, one embodiment of the present invention will be described with reference to the accompanying drawings.

Figure 1:
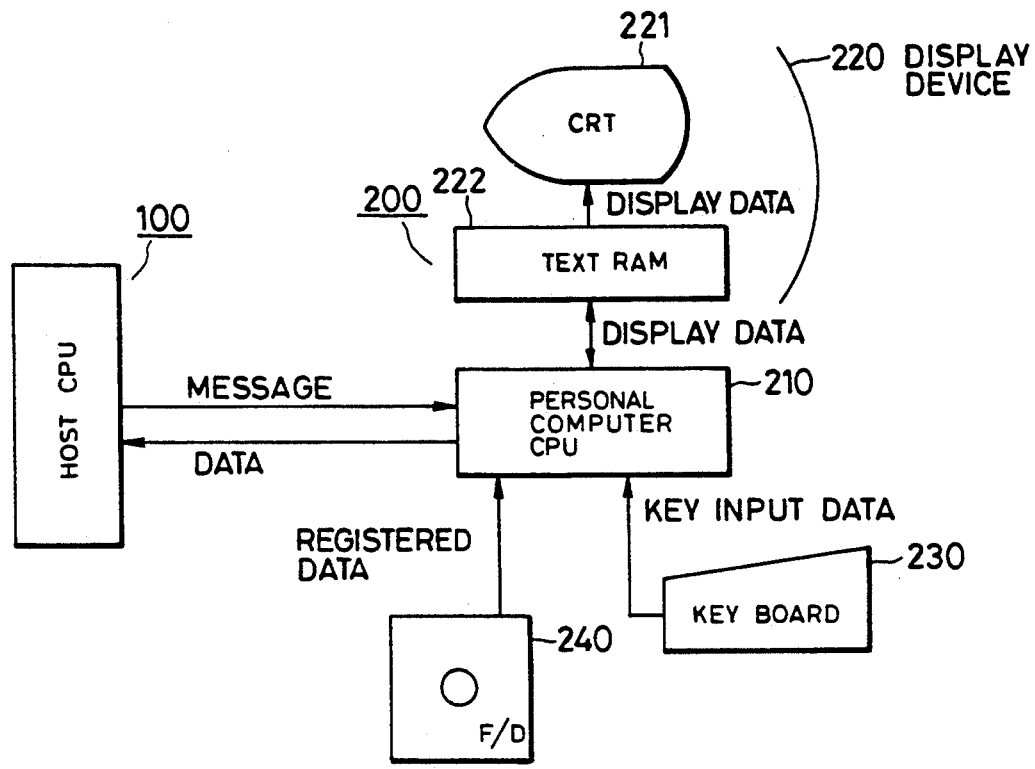
FIG. 1 is a block diagram useful for explaining the system configuration in accordance with one embodiment of the present invention.
Figure 2:
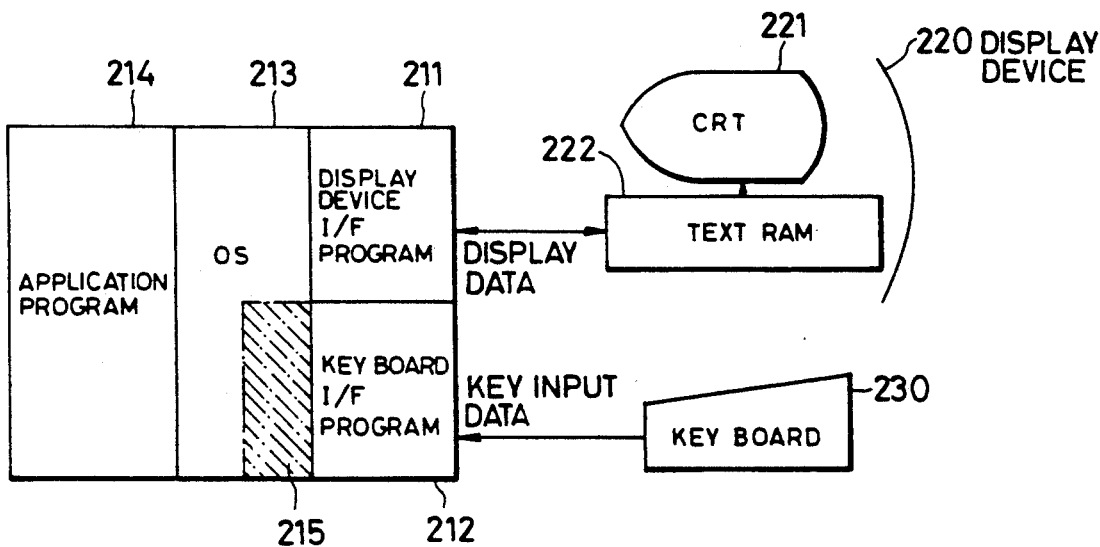
FIG. 2 is an explanatory view useful for explaining various programs of the embodiment shown in FIG. 1.

FIG. 1 shows a computer system consisting of a host computer 100 and a personal computer (local computer) 200. These computers are connected by data lines so as to exchange commands, data or various messages. The personal computer 200 as a data processor consists of a main body 210 incorporating a central processing unit, a display device 220 consisting of a display 221 and a text RAM (Random Access Memory) 222 for storing the data to be displayed on the display 221, an input device 230 for inputting various commands and data such as a typewriter type input device and an external memory device 240 for storing various data. Needless to say, the computer main body 210 includes various interface circuits such as an interface circuit for data communication, and a main memory, and the main memory further reads programs of various levels as shown in FIG. 2. Referring to FIG. 2, reference numeral 213 represents an OS (Operating System) determining the nature of the personal computer 200, and reference numerals 211 and 212 represent display interface program and keyboard interface program that operate under the management of OS 213, respectively. These programs of a lower order are for the input/output operations which are generally referred to as "BIOS (Basic Input/Output System)". Incidentally, the lower order program for the input/output operations of the interface circuit for data communication is also included in this BIOS, though its detail is not shown in the drawing. Besides the input device 230 of a typewriter type, these data communication circuits (devices) can be defined as a kind of input (output) devices in a broad sense of the word.

Reference numeral 214 represents an application program operating on OS 213. In this embodiment, a communication program for using the personal computer 200 as a terminal device of the host computer 100 is read in. Reference numeral 215 represents an input/output program for accomplishing the input operation as the characterizing portion of the apparatus of this embodiment. As can be seen obviously from the drawing, the input/output program 215 is primarily positioned between OS 213 and the keyboard interface program 212 and applies necessary work to the signals (data) exchanged between OS 213 and the keyboard interface program 212.

Figure 4:
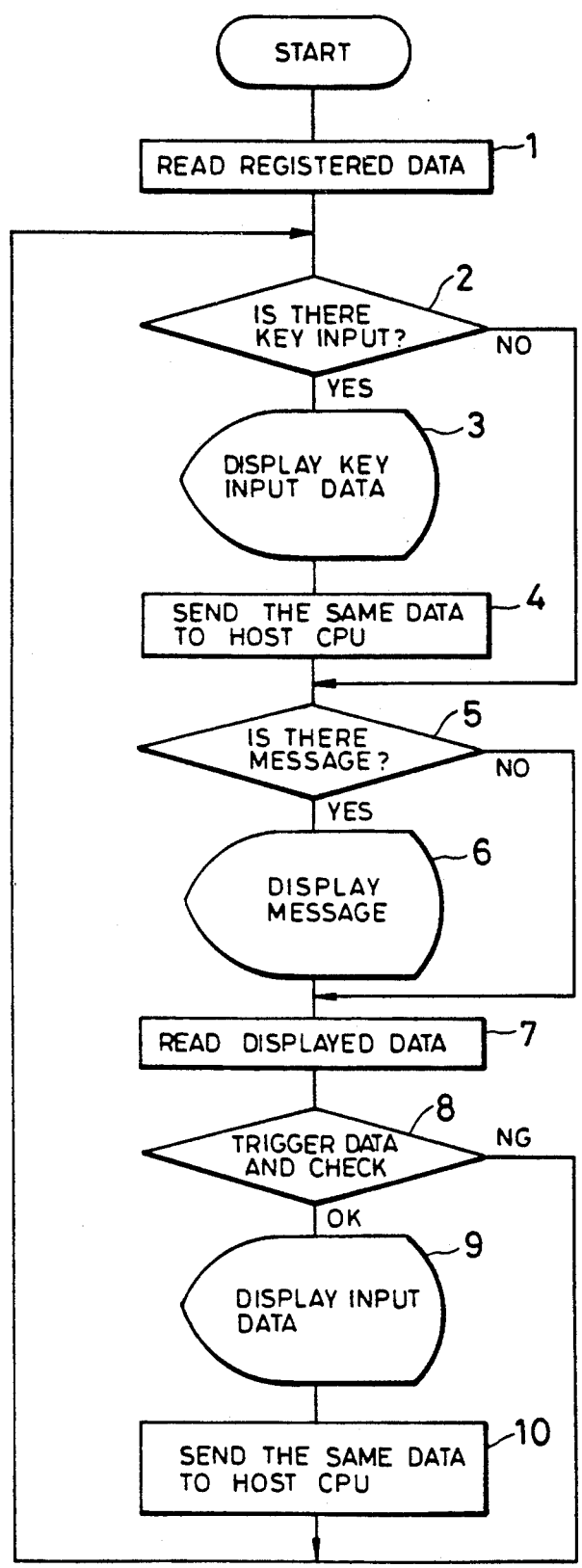
FIG. 4 is a flowchart useful for explaining the operation of the embodiment of FIG. 1.

Next, the outline of the operation of the input/output program 215 will be explained with reference to FIGS. 3 and 4. First of all, when the input/output program 215 is executed, the input/output program 215 locates itself between OS 213 and the keyboard interface program 212 and secures a work area of its own for reading registered data as shown in FIG. 3. After such a preparation, the input/output program reads in the registered data. The registered data of the type such as shown in FIG. 3 is prepared in advance in external memory device 240. The registered data includes a table of correspondence relation between trigger data to be displayed on display device 220 and the input data to be outputted when this trigger data appears. The trigger data consists of data relating to the display position of the display device 220 and data relating to display character displayed on the display device.

Thereafter, the input/output program 215 operates whenever any demand occurs from the application program 214 or OS 213 to the input device 230 and executes a pseudo-input/output operation for the application program 214, OS 213 or the keyboard data interface program 212.

Now, after the host computer 100, the personal computer 200 and other communication lines are ready, a key demand occurs from the host computer 100 through the application program 214. Upon receiving this key demand, the input/output program 215 confirms the existence of any data input from the input device 230 at step 2 shown in FIG. 4 and if input data exists, displays the data inputted from the input device 230 through OS 213 and the display interface program 211 on the display device 221, at step 3. At the next step 4, the input/output program 215 delivers the same data to the host computer 100 through OS 213 and the application program 214. Next, the input/output program 215 confirms whether or not an answer-back of a message from the host computer 100 exists at step 5 and if it does, displays the message on the display 221 through OS 213 and the display interface program 211. After the display of this message, the input/output program 215 reads in the data relating to display character or display surface from the display position of the trigger data read in advance into the work area, at step 7. More definitely, the associated address of the text RAM 222 of the display device 221 is calculated from the data relating to the display position of the trigger data through the display interface program 211, and the content stored in the text RAM 222 at this calculated address is read out. Subsequently, the data read from the text RAM 222 and the data relating to the display character of the trigger data that have in advance been read in the work area are compared at step 8 and if they are in agreement, the input data corresponding to the trigger data read in advance in the work area is displayed at step 9 on the display device 221 through OS 213 and the display interface program 211 and is transmitted at step 10 to the host computer 100 through OS 213 and the application program 214. After transmission of the input data, control shifts to the host computer 100 and the input/output program 215 itself waits for the input demand from the side of the host computer 100. Though the branch processing when the condition is not true at each of the steps 2, 5 and 8 is not described in detail, the processing proceeds while skipping suitably the intermediate steps as is obvious from FIG. 3.

In the embodiment described above, when the message "ENTER LOGON" arrives from the host computer 100, the command "LOGON" can be inputted without operating the input device 230. Since the actual display surface is read in order to confirm the correspondence relation with the trigger data in the embodiment described above, the data that is inputted by the input device 230 and displayed by the display device 221 and the data that arrive from the host computer 100 and displayed on the display device 221 can be handled in the same way. This means that on the side of the personal computer 200, a local pass-word can be set, for example. More definitely, if the local pass-word as the trigger data and the true pass-word (the pass-word registered to the host computer 100) as the automatic input data are in advance registered as the registered data of the input/output program 215, it becomes possible to transmit the true pass-word to the host computer 100 when the local pass-word is inputted from the input device 230 provided that this local pass-word is in agreement with the local pass-word that is in advance registered.

In accordance with the embodiment described above, the reply command can be automatically transmitted in accordance with the message of the host computer 100 and the input operations of data or command can be reduced. Since the input data can be replied by converting it to other data, management of the pass-word or the like can be made more carefully.

Incidentally, though not explained in detail in the embodiment described above, there are various levels (kinds) of input demands from the application program 214 (host computer 100) such as one wherein the data input from the input device 230 is immediately displayed on the display device 221 through OS 213 and the display interface program 211 (with the acquired data being naturally returned to the application program 214, too, through OS 213), one wherein the acquired data is sent to the host computer 100 through OS 213 and the application program 214 and the answer-back data is displayed on the display device 230, and so forth.

Figure 6:
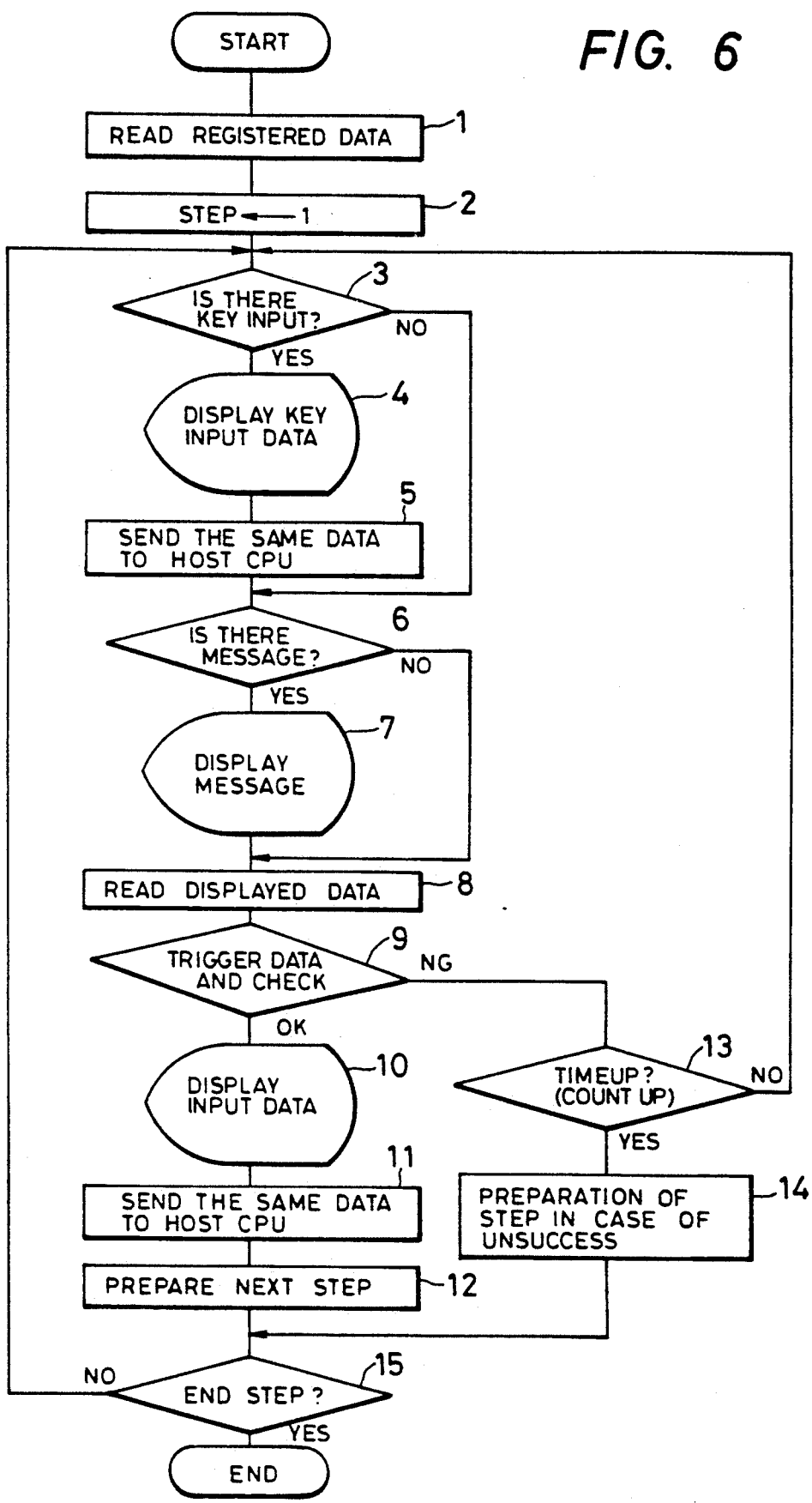
FIG. 6 is a flowchart useful for explaining the operation of the embodiment shown in FIG. 5.

Next, another embodiment of the present invention shown in FIGS. 5 and 6 will be described. Whereas the foregoing embodiment cannot control the transition of the automatic input (transition of the input status), this embodiment reinforces this point. In this embodiment, a plurality of sets of registered data are prepared as shown in FIG. 5 and the concept of step processing is added to them. More definitely, there are disposed data relating to the check time for setting the limit of repetition of condition check with the trigger data in every predetermined time or in every predetermined number of times at each step, and data relating to the out-of-condition step for setting the destination step when the condition is not true within the check time. Namely, the registered data shown in FIG. 5 prepares in advance the relation between the commands to be answered back in response to the message from the computer 100 at each step in order to execute TSS (Time Sharing System) processing by utilizing the host computer 100. Inside the input/output program 215 is prepared a work area for reading the registered data, a step counter for managing the step to be executed at present and a time-up counter for repeating the condition check.

Next, the operation of the input/output program of this embodiment will be explained with reference to the flowchart shown in FIG. 6. When the input/output program is read, the input/output program makes an initial setting of its own in the same way as in the foregoing embodiment, then reads the registered data explained in FIG. 5 from the external memory device and sets the data of step 1 of FIG. 5 into its own work area. At the next step 2, the input/output program sets the first step "1" to the step counter and then waits for the input demand from the OS or the application program. The operations of the subsequent steps 3 to 7 are the same as those of the foregoing embodiment and will not therefore be described. When the display data read at the step 8 satisfies the condition of the trigger data, processing is made at the steps 10 and 11 in the same way as in the foregoing embodiment. At the next step 12, the step counter is updated and the trigger data and the input data to be checked next are read. When the condition is not true as a result of the condition check at the step 9, the number of times or time of the condition check is checked at the step 13, and if they are not over the limit, control is returned to the step 3. In case of unsuccess, on the other hand, the number of steps of out-of-designated conditions that is in advance registered to the registered data and various data corresponding to this step number are prepared in the step counter and the work area at the step 14. Next, when the new step is prepared at the step 12 or 14, whether or not this new step represents completion is checked at the step 15 and if it does, the input/output program 215 is completed and if not, control is returned to the step 3 et seq.

Next, the relation between the data shown in FIG. 5 will be explained. When the preparation on the side of the host computer 100 is complete, the input demand arrives at the input/output program through the application program. If there is no key input from the input device at this stage, the flow proceeds to the step 6 and if there is no message from the host computer 100, the display data is taken in from the display device 220 at the step 8. The data thus taken in is compared with the trigger data at the step 9 but since the trigger data is blank as shown in FIG. 5, the automatic input data "LOGON" at this step "1" is unconditionally displayed on the display device 220 at the step 10 and this data is transmitted to the host computer 100 at the step 11. Thereafter, the input/output program 215 reads the trigger data of the next step "2" and updates the step counter to "2". Next, whether or not the data thus read is an end step is checked at the step 15, but since it is not yet the end step, control is started once again from the step 3 in FIG. 6.

Due to the automatic input of "LOGON", the host computer 100 displays "MODE=" on the display device 221 and waits for the key input demand. Therefore, the steps 3 and so on are executed and "MODE=" is read from the display device 221 at the step 8 and is compared with "MODE=" of the trigger data at the step 9. If both "MODE=" are found to be in agreement with each other at the step 9, the "TSS" command of the input data is outputted at the subsequent steps 10 and 11. If the message "MODE=" has not yet been arrived from the host computer 100 at this stage, count-up of the time-up counter is made at the step 13 and whether this value is within the check time set in FIG. 5 is examined. If it is within the check time, the steps 3 and so forth are executed once again. In other words, at the step 13, the waiting condition continues till the display data is in agreement with the trigger data within the check time. If they are not in agreement within the check time, the number of steps in case of unsuccess shown in FIG. 5 and the trigger data or automatic input data corresponding to this step number is again read into the step counter and other work areas at the step 14.

In the embodiment described above, a plurality of trigger data and input data corresponding to the former are prepared and the items of the check time and the step in case of unsuccess are prepared for each of these data. Therefore, if the necessary message is not obtained from the host computer 100 within the check time, the personal computer 200 returns the execution step number of the input program 215 and the automatic input can be repeated once again.

In this embodiment, when any input demand occurs from the host computer 100 or application program 214, the input demand is repeatedly and continuously generated from OS 213 to the keyboard data input program 212, and the number of occurrence is counted and used for the management of the check time. In other words, when the display data and the trigger data are not in agreement at the step 9, the time-up counter is counted up. The time-up counter is initially set when the trigger data of the next processing is read in at the step 12 or 14.

It is of course possible in this embodiment to utilize a suitable timer for the management of the check time.

Figures 7, 8:
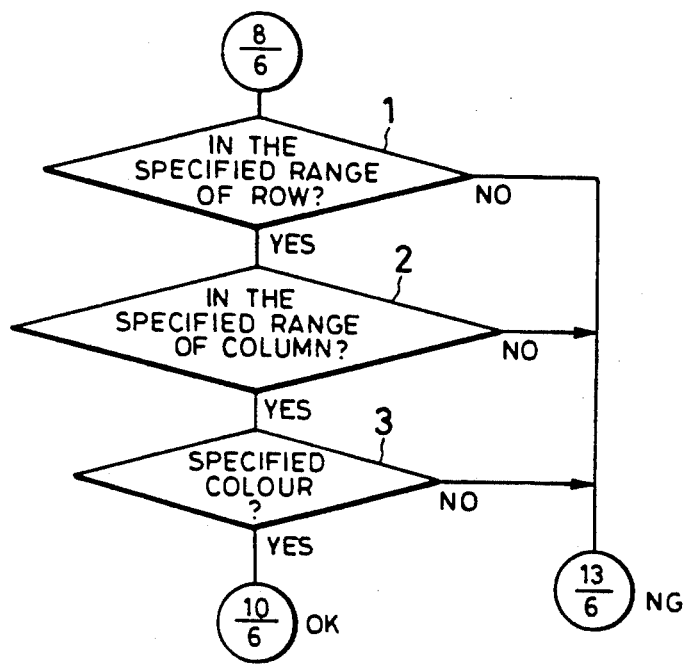
FIG. 7 is an explanatory view useful for explaining the construction of the registered data in still another embodiment of the present invention.
FIG. 8 is a flowchart useful for explaining the operation of the principal portions of the embodiment shown in FIG. 7.

Next, still another embodiment of the invention will be explained with reference to FIGS. 7 and 8. This embodiment expands the step 9 explained with reference to FIG. 6, that is, the portion relating to the comparison processing with the trigger data. Namely, the number of items of the trigger data is increased so that the range of position to be taken into by the display device 221 can be designated for the display data to be compared and the attribute of the display data such as a display color can be compared, too, as represented by a typical construction of the trigger data shown in FIG. 7. In this embodiment, the start row (lower) and end row (higher) of the display data to be taken into by the display device 221, its start column (lower) and end column (higher), and each trigger data of the display color are prepared, in order to confirm whether or not the display data corresponding to the trigger data exists among those display data received by the display device 220. More definitely, whether or not the data corresponding to the display character of the trigger data exists within the row range designated by the trigger data is examined in the step 1 in FIG. 8, whether or not the data corresponding to the display character of the trigger data exists within the column range designated by the trigger data is examined at the step 2 and whether or not the display character has the color designated by the trigger data is examined at the step 3. When all these conditions prove to be true, the processing of step 6 and so forth shown in FIG. 6, for example, is executed and the output operation (whose detail is omitted in FIG. 7) of the input data is carried out. When the conditions are not true, on the other hand, the processing of step 13 and so forth shown in FIG. 6 is carried out. More definitely, in the case of the trigger data shown in FIG. 7, the output processing of the input data, not shown, is carried out when the white "ENTER" character is displayed on substantially the entire surface of the display device 221, and the next input data is outputted when the red "LOG" character is displayed from 1-row 1-column of the surface.

As described above, it is possible in this embodiment to use not only the character data but also the display color of the display device 221 for comparison with the trigger data.

Next, an example of the construction of the trigger data shown in FIG. 9 will be explained. This example is different from the trigger data shown in FIG. 5 in the steps "4" and "5". The input data is not set in these steps. Therefore, in the steps "4" and "5", processing with the host computer 100 does not proceed unless the data corresponding to the trigger data "4671" and "K.Y" are inputted by the input device 230 of the personal computer 200. In other words, if such a trigger data construction is employed, management of the password and the like can be cut off from the host computer 100 and be conducted on the side of the personal computer 200 alone.

Next, an example of the construction of the trigger data shown in FIG. 10 will be explained. The characterizing portion of this example lies in that the local pass-word on the side of the personal computer 200 is disposed at the steps "4" and "5". If such a construction of the trigger word is employed, a control code of CANcel character CAN for cancelling this local pass-word "A123" is outputted when such a local pass-word "A123" is inputted from the input device 230 at the step "4" and then the pass-word "4671" of the host computer 100 is outputted continuously and automatically. At the subsequent step "5", a control code CAN for cancelling a local identification code "XYZ" is outputted when such a local identification code "XYZ" which is effective on the side of the personal computer 200 is inputted, and then an identification code "K.Y" which is effective on the side of the host computer 100 is outputted. Therefore, if such a trigger data and an input data are prepared, the local pass-word can be set and managed on the side of each personal computer 200 separately from the host computer 100.

More definitely, all that are handled by the input device 230 and display device 221 of the personal computer 200 are local pass-words and the pass-word on the side of the host computer 100 is not at all displayed. This means that even if a third party comes to know the local pass-word, he cannot utilize it directly. Since the local pass-word can be changed easily by updating the registered data, data security of the pass-word and the like can be improved by updating the registered data either regularly and/or irregularly.

In this embodiment, the flow proceeds to the next step when the trigger data is in agreement with the display data at each step. Therefore, it is possible to employ a hierarchical structure for the local pass-word and to manage it by preparing a plurality of steps for the comparison processing with the local pass-word.

As to the relation between the host computer 100 and the personal computer 200, the foregoing embodiments deal with the case where the communication program is read as the application program 214 of the personal computer 200. However, the present invention can of course be utilized for the application program executed by the personal computer 200 alone.

Figure 11:
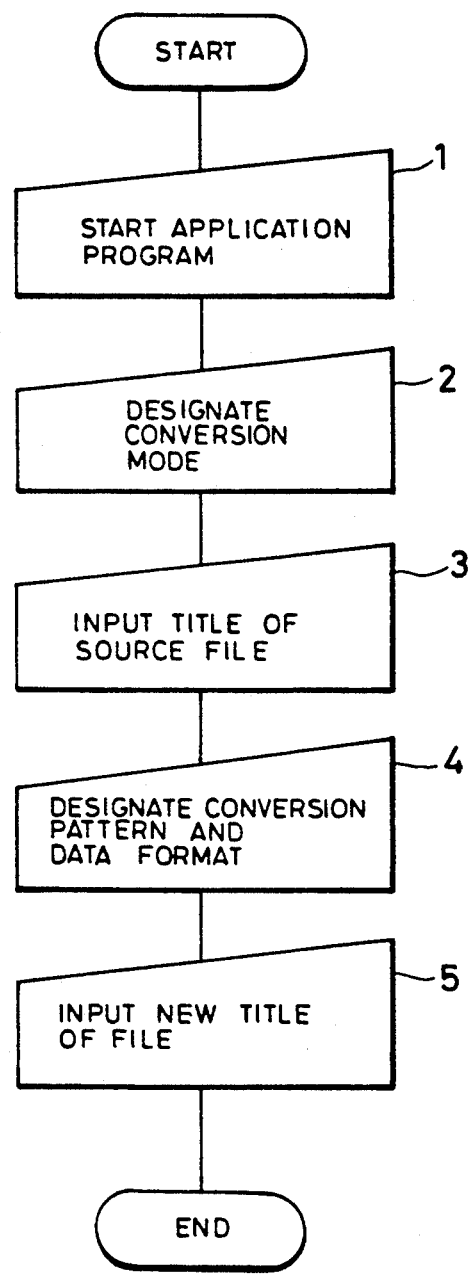
FIG. 11 is a flowchart useful for explaining the processing flow of an application program to be executed in the embodiment shown in FIG. 1.

Namely, FIG. 11 shows an example of the application program 214 which makes file conversion. This application program 214 can be executed in the following manner. First of all, the program is started at step 1, and then the conversion mode, the source file name, the conversion pattern/date format and the new file name must be inputted at steps 2, 3, 4 and 5, respectively. Therefore, in this embodiment, the registered data such as shown in FIG. 12 is in advance prepared so that each of these command data can be inputted without through an operator. In other words, before the start of the application program 214, the input/output program 215 is started. Then, after reading the registered data, the input/output program 215 outputs unconditionally "FCNV" at step "1" and starts the application program 214 (where "FCNV" represents the program name of the application program). Thereafter, whenever the message is displayed on the display device 221 from the application program 214 and the input demand arrives, the input/output program 215 outputs the input data corresponding to this message (which is in agreement with the trigger data) and executes the processing. In accordance with this embodiment, the subsequent processing can be carried out without touching the input device 230 after the start of the input/output program 215.

Next, an example of the construction of the trigger data shown in FIG. 13 will be explained. In this example, setting of the local pass-word is made at the step "2" in addition to the construction shown in FIG. 12. Namely, unless the local pass-word "K.Y" is inputted, the subsequent processing cannot be made in this example. In this manner, this example can set the local pass-word by utilizing the input/output program 215 in the application program 214 not having the pass-word registration function.

In a data processor including an input device for inputting commands or data, a central processing unit for executing predetermined processing in accordance with the input command or data from the input device and a display device for displaying the input command or data from the input device or the message generated by the central processing unit, the present invention provides a data processor which comprises display data read means for reading out the display data displayed on the display device, input data memory means for storing a trigger data to be displayed on the display device and an input data corresponding to the trigger data, judgement means for judging whether or not the display of the display device is equal to the trigger data stored in the input data memory means and input means for outputting the input data corresponding to the trigger data from the input data memory means to the central processing unit in accordance with the result of judgement by the judgement means. In accordance with the present invention, it is possible to obtain easily a data processor having the security function of data which can be revised reliably and flexibly.

What is claimed is:

1. A data processor comprising:

an input device for inputting information;

a central processing unit for executing predetermined processes in accordance with said information input by said input device and generating messages related to said predetermined processes;

a display memory for storing display data corresponding to said messages generated by said central processing unit;

a display device for displaying said display data stored in said display memory;

input data memory means for storing trigger data and input data corresponding to said trigger data, said input data corresponding to said predetermined processes performed by said central processing unit and said trigger data includes position data indicative of a specific position on said display device and data to be displayed at said specific position;

judgements means for judging whether display data corresponding to said messages stored in said display memory satisfies a predetermined relationship to said trigger data; and output means for sending input data corresponding to said trigger data from said input data memory means to said central processing unit when said predetermined relationship is judged to be satisfied by a judgement operation performed by said judgement means.

2. A data processor as defined in claim 1, wherein said trigger data stored in said input data memory means further includes attribute data of characters of said data to be positioned on said display device.

3. A data processor as defined in claim 1, further comprising:

display data read means for reading out said display memory to said display device before said judgement operation is performed by said judgement means.

4. A data processor as defined in claim 1, wherein said data to be positioned includes said trigger data which includes a character code corresponding to characters to be displayed on said display device.

5. A data processor as defined in claim 2, further comprising:

display data read means for reading out display data which includes character codes of said characters and said attribute data from said display memory to said display device.

6. A data processor as defined in claim 1 wherein said central processing unit includes means for demanding an input of a new command or new data in accordance with the command or data inputted by said input device, and said judgement means for judging whether or not display data in said display memory coincides with said trigger data stored in said input data memory means whenever said central processing unit generates an input demand.

7. A data processor as defined in claim 6, which includes said input data memory means for storing in advance a plurality of sets of combinations of said trigger data and said input data corresponding to said trigger data.

8. A data processor as defined in claim 7, wherein said input data memory means stores data representing said combinations of said trigger data and said corresponding input data to be judged next in accordance with the result of said judgement operation of said judgement means.

9. A data processor as defined in claim 7, wherein said input data memory means stores data representing a number of repetitions of said judgement operation when conditions of said judgment operators are not true.

* * * * *